United States Patent
Vezzosi et al.

(10) Patent No.: US 9,779,368 B2
(45) Date of Patent: Oct. 3, 2017

(54) DYNAMIC INHERITANCE OF METADATA CONCEPTS FROM PROJECT RESOURCES INTO A SEMANTIC MODEL

(71) Applicants: Pierpaolo Vezzosi, Villiers le Morhier (FR); Didier Mazoue, Issy les Moulineaux (FR)

(72) Inventors: Pierpaolo Vezzosi, Villiers le Morhier (FR); Didier Mazoue, Issy les Moulineaux (FR)

(73) Assignee: Business Objects Software Ltd., Dublin (IE)

( * ) Notice: Subject to any disclaimer, the term of this patent is extended or adjusted under 35 U.S.C. 154(b) by 630 days.

(21) Appl. No.: 14/094,394

(22) Filed: Dec. 2, 2013

(65) Prior Publication Data

US 2015/0154240 A1  Jun. 4, 2015

(51) Int. Cl.
*G06Q 10/06* (2012.01)

(52) U.S. Cl.
CPC .................................... *G06Q 10/06* (2013.01)

(58) Field of Classification Search
CPC ........ G06F 17/30339; G06F 17/30498; G06Q 10/06
See application file for complete search history.

(56) References Cited

U.S. PATENT DOCUMENTS

| | | | |
|---|---|---|---|
| 9,268,801 B2 | 2/2016 | Mazoue | 707/803 |
| 2003/0225769 A1* | 12/2003 | Chkodrov | G06Q 10/06 |
| 2010/0106747 A1* | 4/2010 | Honzal | G06F 17/30592 |
| | | | 707/803 |
| 2010/0121837 A1* | 5/2010 | Vergnory-Mion | G06F 17/30498 |
| | | | 707/713 |
| 2012/0158757 A1* | 6/2012 | Bhattacharjee | G06F 17/30607 |
| | | | 707/756 |
| 2014/0181154 A1* | 6/2014 | Amulu | G06F 17/30587 |
| | | | 707/803 |

* cited by examiner

*Primary Examiner* — Robert Beausoliel, Jr.
*Assistant Examiner* — Susan F Rayyan
(74) *Attorney, Agent, or Firm* — Fish & Richardson P.C.

(57) ABSTRACT

The present disclosure describes methods, systems, and computer program products for inheriting metadata concepts from product resources into a semantic model. One computer-implemented method includes defining a plurality of core data foundations, defining a derived data foundation by linking the plurality core data foundations to the derived data foundation, defining a plurality of core business layers, defining a derived business layer by linking the plurality of core business layers to the derived business layer, and compiling, by a computer, the derived business layer with the derived business layer as a universe.

24 Claims, 3 Drawing Sheets

DYNAMIC INHERITANCE OF METADATA CONCEPTS FROM PROJECT RESOURCES INTO A SEMANTIC MODEL

BACKGROUND

When creating complex semantic models for a project, there is often a need to reuse the same metadata concepts (objects) in multiple resource artifacts (resources). However, objects are often duplicated in multiple resources without an inheritance mechanism. In addition, in many situations, multiple people may be working on a similar project and sharing work can impact the work of others working on the project. Data for the project is also typically sourced from a particular data source without the ability to span multiple data sources. The inability to reuse the same objects in multiple resources, have changes to a resource dynamically reflected to other semantic models, to share work without impacting others, and to federate data from different data sources into a project is inefficient, resource intensive, and increases the total cost of ownership of using complex semantic models.

SUMMARY

The present disclosure relates to computer-implemented methods, computer-readable media, and computer systems for inheriting metadata concepts from product resources into a semantic model. One computer-implemented method includes defining a plurality of core data foundations, defining a derived data foundation by linking the plurality core data foundations to the derived data foundation, defining a plurality of core business layers, defining a derived business layer by linking the plurality of core business layers to the derived business layer, and compiling, by a computer, the derived business layer with the derived business layer as a universe.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein each core data foundation of the plurality of core data foundations can be defined on different data sources.

A second aspect, combinable with any of the previous aspects, further comprising customizing the derived data foundation by at least one of selecting only necessary core database tables, adding JOINS between tables from different core data foundations, adding contexts, adding calculated columns, or adding a list of values or parameters.

A third aspect, combinable with any of the previous aspects, further comprising customizing the derived business layer by at least one of selecting which core objects to expose, adding new objects, adding new lists of value or parameters, or adding new navigation paths.

A fourth aspect, combinable with any of the previous aspects, wherein the universe is compiled at design time and no additional compilation time is required at query time.

A fifth aspect, combinable with any of the previous aspects, further comprising modifying a core resource, the core resource being either a data foundation or a core business layer.

A sixth aspect, combinable with any of the previous aspects, further comprising propagating a modification to the core resource to the associated data source.

A seventh aspect, combinable with any of the previous aspects, further comprising performing one of: opening a derived resource which has been derived from the modified core resource, re-publishing a derived business layer derived from the modified core resource, or re-publishing a derived business layer if an inherited database connection linking the core business layers with the derived business layer has been modified and re-published.

The subject matter described in this specification can be implemented in particular implementations so as to realize one or more of the following advantages. First, the inheritance mechanism is limited to resources of the modeling project and only the part which should be made public is published. This provides tighter data security and reduces the need for resources and bandwidth. Second, the inheritance mechanism enables federating information from models built on multiple data sources. Third, the final published project is compiled at publication time and no dynamic inheritance has to be calculated at usage time. This improves overall system performance. Fourth, only what is necessary to be exposed in a universe if published. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, computer-program products, and systems for inheriting metadata concepts from product resources into a semantic model. The following description is presented to enable any person skilled in the art to make and use the invention, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

For the purposes of this disclosure, a "universe" is a model of a database. At a high level, the universe is represented by a file or files that specify what is in the database and what should be exposed to database users (e.g., customer concept, revenue concept, product concept, etc.). A universe is compiled from multiple resource files to enable reuse of the data representations and the sharing of the work (e.g., sharing, resource usage, etc.).

At a lower level, a universe file contains:
Connection parameters for one or more database middleware.
Structured query language (SQL) structures called objects that map to data or a derivation of data in the database. For example, an object can contain SQL structures mapping to actual SQL structures in the database such as columns, tables, and database functions. Objects are grouped into folders which are logical groupings of objects within a universe. A folder represents a category of objects.
A schema of the tables and joins used in the database. Objects are built from the database structures included in the schema.

Users typically connect to a universe which acts as an easy to use and understandable interface to a database and can run queries against the database. Data analysis can be performed and reports generated using the objects in the universe without users having knowledge of the underlying data structures in the database. The universe performs a transformation between a representation of data exposed to the end user (e.g., customer, revenue, product, etc.) and a physical representation in the database.

In some implementations, published universes can also be linked and compiled at query time into a derived universe. The linking allows individual universes to be linked into a larger universe which generally points to some or all information from each of the linked universes.

When creating complex semantic models for a project, there is often a need to reuse the same metadata concepts (objects) in multiple resource artifacts (resources). However, objects are often duplicated in multiple resources without an inheritance mechanism. In addition, in many situations, multiple people may be working on a similar project and sharing work can impact the work of others working on the project. Data for the project is also typically sourced from a particular data source without the ability to span multiple data sources. The inability to reuse the same objects in multiple resources, have changes to a resource dynamically reflected to other semantic models, to share work without impacting others, and to federate data from different data sources into a project is inefficient, resource intensive, and increases the total cost of ownership of using complex semantic models.

This disclosure describes enabling a resource to dynamically inherit objects from other resources while authoring the resource content, teams of developers to work in parallel and to share their work, and to dynamically extend an existing resource. Only the parts of the core resources which should be made public for consumption is exposed/published to a single customized universe for consumption by end users.

Additionally, a mechanism is provided by which it is possible to interrelate and federate multiple core resources defined on different data sources (e.g., databases) into a single overall project inheriting objects and data links from the multiple resources. First a data foundation is defined (e.g., database tables, operations, etc.) and then the business layer is defined from the data foundation (e.g., customer concept, etc.).

Resource files are typically only viewed by technology specialists (e.g., information technology (IT), etc.). When a technology specialist wishes to expose one or more business layer concepts to an end user, the technology specialist compiles (publishes) a universe out of a database foundation layer file and a business layer file using a compilation workflow available as a user interface in an information design tool (IDT) or using its SDK.

Figure 1:
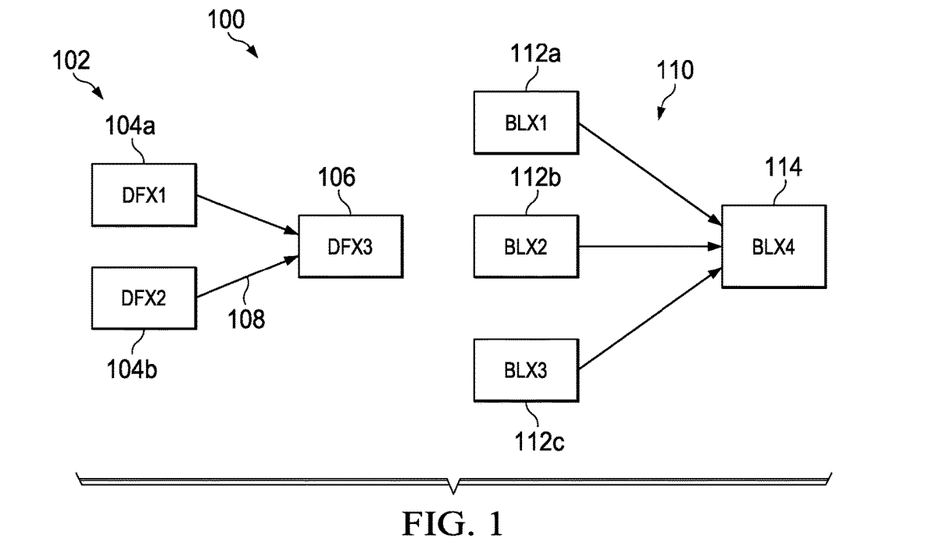
FIG. 1 is a block diagram illustrating general relationships between data foundation and business layer resources according to an implementation.
Figure 2:
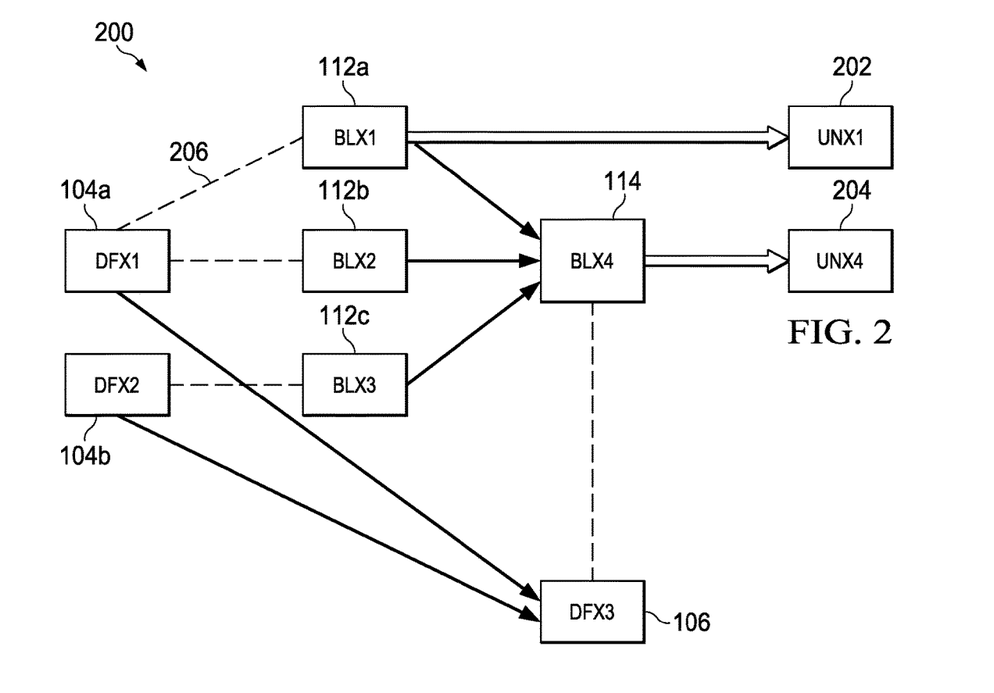
FIG. 2 is a block diagram illustrating multiple linked resources compiled into universes according to an implementation.

FIG. 1 is a block diagram 100 illustrating general relationships between data foundation and business layer resources according to an implementation. Data foundation resources (DFX) represent the database and allow viewing of database tables, JOINS, etc. Business layer resources (BLX) 110 represent data in business terms such as customer concept, revenue concept, product concept, etc. to expose to a user. Business layer resources are built on top of data foundation resources. Universes are published using the above-described compilation workflow from both data foundation and business layer resources and their indicated relationships (e.g., links). For example, DFX3 106 and BLX4 114 could be compiled together to form a universe (not illustrated—refer to FIG. 2). Note that the end user does not see objects from core resources when a universe is compiled. For example, objects from BLX1/2/3 112*a/b/c* are not seen, only objects from BLX4 114 (which are inherited) and from BLX4 114, only those objects that are allowed to be published. Those objects that are not allowed to be published are not compiled, only objects that are allowed to be viewed are compiled into a universe. Note that, as illustrated in FIG. 2, while other BFXx and DFXx core resource objects may not be allowed to be seen when compiling BLX4 114 and DFX3 106, the other core resources (e.g., DFX1 104*a* and BLX1 112*a*) can themselves be compiled into a universe/s (e.g., UNX1 202).

Data foundation resources 104*a/b* (DFX1/DFX2, respectively) are considered "core" resources in that they form the core of the "derived" data foundation 106 (DFX3) resource. Resource 106 is derived in that is inherits objects/metadata (objects) from core resources 104*a/b* and is said to contain inherited objects. In some implementations, a derived resource can contain objects not inherited from core resources. In this case, the derived resources is said to be enhanced. An object in a core resource can be set to be inherited or not. Typically the decision as to whether an object is allowed to be inherited is made by a resource designer. Note that an object can be inherited from a core resource to a derived resource and then inheritance can cease with the derived resource although the derived resource can serve as a core resource to another derived resource. In some implementations, a visual representation of a derivation map for data foundations and business layers can be generated to simply the tracking and understanding of the project for designers.

In some implementations, when an inheritance conflict is detected, the resource designer is asked how to rectify the conflict. Optionally the choice can be recorded to either automatically apply on a further conflict or offered to the designer on a further conflict. In an alternate implementation, a priority mechanism can be implemented where particular resources can "win" when conflicts are detected based on a priority or other order.

Link 108 links core and derived resources and indicates a dependency between resources. Note that the link 108 has an arrow indicating the flow of inheritance between the resources (here from resources 104a/b to resources 106). Derived resource 106 is therefore said to inherit object(s) from resource 104a/b and resource 106 is considered dependent upon resources 104a/b. It should be apparent to those of skill in the art that a core resource in relation to a further derived resource can also serve as a derived resource for other core resources. The same can be said of derived resources serving as core resources to a further derived resource.

Changes to objects in core resources 104a/b are said to be synchronized or pushed to derived resources. While objects will typically be pushed from core resources to derived resources, in some implementations, object changes can be pulled from core resources to derived resources. As will be apparent to those of skill in the art, the method of transport for object changes from core resources to derived resources can vary and are consistent with this disclosure considered to be within the scope of the disclosure. Whenever a core resource is modified and saved, changes are transported to any resource derived from it. In some implementations, automatic synchronization occurs as soon as the resource is saved. In some implementations, manual synchronization can occur. For example, a designer can manually select an action to synchronize core changes to derived resources. Manual synchronization can be triggered either from a core resource (e.g., to synchronize all derived) or from a derived resource (e.g., to synchronize only that resource on the latest change of the core).

The explanation with respect to data foundation resources 102 also apply to business layer resources 104 (core resources 112a/b/c and derived resource 114). A list of linked resources forming a single solution is referred to as a linked project or a set of linked resources. The overall compiled universe can expose objects from one or many business layer resources for consumption.

In some implementations, when deriving multiple single source data foundations, it is possible to decide if the derived data foundation is still single source or multi-source. It is possible to add a core resource to an already existing derived resource (e.g., derived DFX3 from DFX1 and DFX2 and then later add DFX4 as core resource to the DFX3 definition). It is also possible to exchange a core resource with another core resource in a derived resource (e.g., derive DFX3 from DFX1 and DFX2 and later exchange DFX4 at the place of DFX1 as a core resource to the DFX3 definition). It is also possible to delete a core resource from a derivation project (e.g., derive DFX3 from DFX1 and DFX2 and later delete DFX2 as a core resource from the DFX3 definition). In some implementations, it is possible to delete a link between derived and core resources to make derived resources "independent" (unlinked) resources.

In some implementations, there are clear rules to explain how a link between core and derived resources must be maintained. For example, these rules could include: 1) it is not possible to rename a core resource; 2) it is not possible to rename a core resource file name; 3) it is not possible to move a core resource to another folder; 4) it is not possible to rename or move the derived resource. Similarly, in some implementations, if a link between core and derived resources is broken, notification is provided (e.g., email, development tool alert, etc.) to allow it to be repaired and actions can be taken to isolate the broken link and affected resources (if possible), notify other affected resources, etc. In some implementations, an algorithm can check the integrity of a derived project (e.g., no broken links, all resources available to provide a successful publication, no conflicts, etc.).

In some implementations, inherited objects in a derived business layer can: 1) be moved to any folder; 2) be hidden, active, or deprecated; 3) have a different list of values than the core object; 4) be renamed.

In some implementations, inherited objects in a derived business layer cannot: 1) be deleted; 2) be modified in their SQL definition (SQL definitions are modified in a core resource).

FIG. 2 is a block diagram 200 illustrating multiple linked resources compiled into universes according to an implementation. Universe files are indicated by universe (UNX1) 202 and universe (UNX4) 204. As illustrated, UNX1 202 is compiled using resource BLX1 112a and DFX1 104a (the dotted line 206 indicates that they are compiled together). Similarly, universe UNX4 204 is compiled using BLX4 114 and DFX3 106. As illustrated, each resource of the business layer can be compiled against a different data foundation resource. It should be noted that only one data foundation resource and one business layer resource are compiled together to form a universe.

This link between the data foundation and the business layer along with what objects can be viewed by a user in a universe is determined prior/at compilation time and not at runtime by the end user. Therefore, until a changed is needed, an information technology specialist makes a decision as to what objects a universe is to expose to an end user and only needs to be compiled once. In this way end users have access to the exposed data without resource-intensive compilation every time data is desired to be viewed with the universe. No dynamic inheritance needs to be calculated at runtime.

In some implementations, each data foundation resource can persist on a different database. For example, DFX1 104a can exist on a relational database (not illustrated), while DFX2 104b can exist on a remote in-memory database (not illustrated). Therefore, DFX3 106 can see the database tables from both databases and can enrich the data sources by JOINING those tables. As the business layer is built on top of the data foundation, the business layer is associated with the data sources they are built on top of. In this way, resource data can be federated from multiple data sources.

In some implementations, when a universe (UNX) defined on derived resources is retrieved, all of its resources and the links between them will be created in the project (e.g., retrieving a UNX defined on three core data foundations, one derived data foundation, two core business layers and one derived business layer will create all seven resources in the local project and will keep the links between them). In some implementations, a choice is provided to retrieve all of the resources or only the derived resources and work with them.

In some implementations, security is applied to each universe published from the derivation project as there is no inheritance of security. In other implementations, security associated with core/derived resources can be inherited and applied to universes using one or more security rules.

Figure 3:
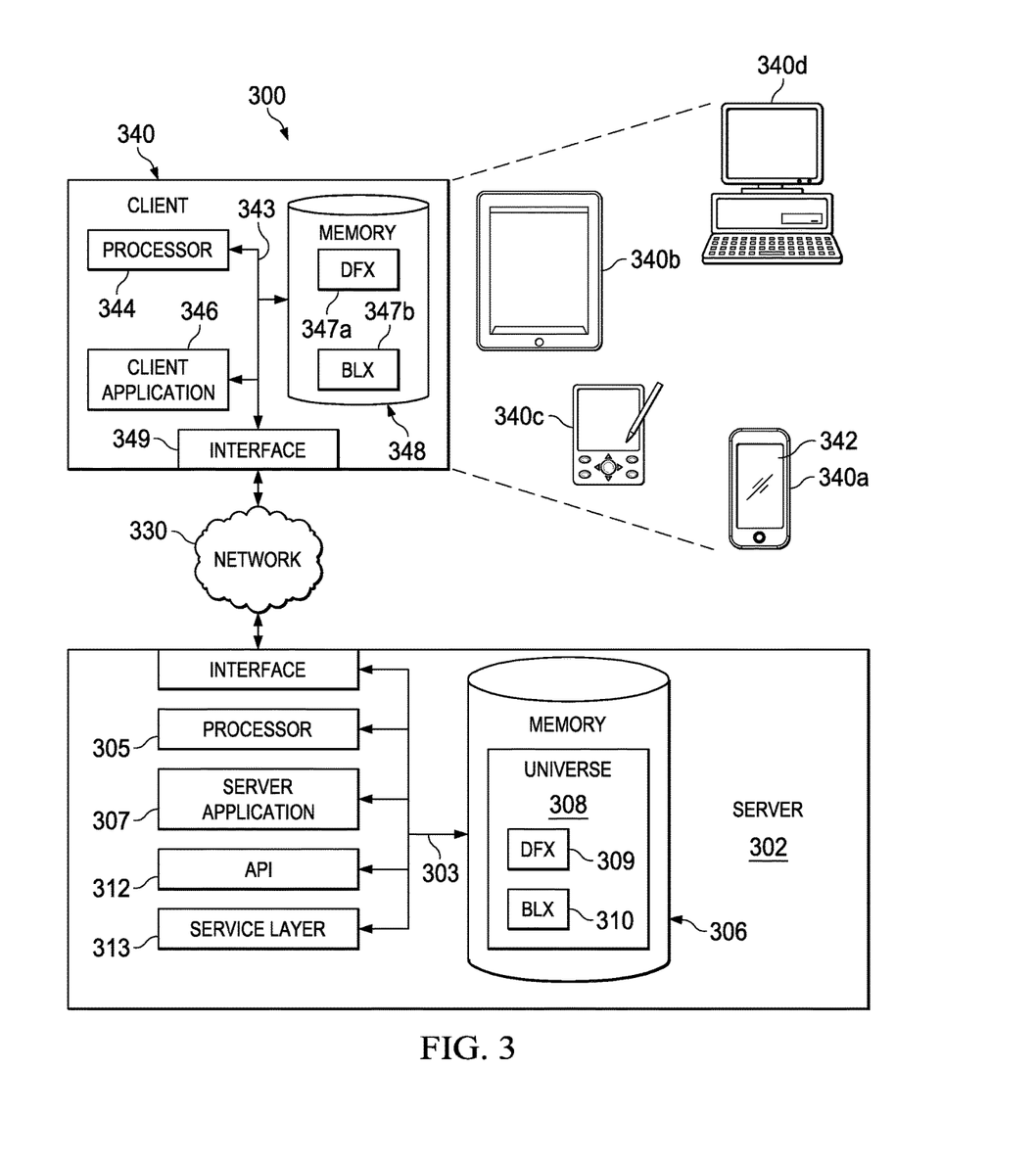
FIG. 3 is a block diagram illustrating an example distributed computing system (EDCS) for inheriting metadata concepts from product resources into a semantic model according to an implementation.

FIG. 3 is a block diagram illustrating an example distributed computing system (EDCS) 300 for inheriting metadata concepts from product resources into a semantic model according to an implementation. The illustrated EDCS 300 includes or is communicably coupled with a server 302 and a client 340 that communicate across a network 330. In some implementations, one or more components of the EDCS 300 may be configured to operate within a cloud-computing-based environment or a peer-to-peer network. For example, multiple clients 340 could communicate to share resource files for use in compiling a universe.

At a high level, the server 302 is an electronic computing device operable to receive, transmit, process, store, or manage data and information associated with the EDCS 300. According to some implementations, the server 302 may also include or be communicably coupled with an e-mail server, a web server, a caching server, a streaming data server, a business intelligence (BI) server, enterprise resource planning (ERP), enterprise portal (EP), and/or other server.

In general, the server 302 is a server that, in some implementations, provides at least functionality for inheriting metadata concepts from product resources into a semantic model. The server application 307 can be any application used to perform functions on, by, and/or for the server 307. For example, the server application 307 can, in some implementations, provide support functionality for inheritance of metadata concepts from product resources into a semantic model such as writing/retrieving universe files 308 from memory 306. Typically, linking of resources and compilation processes are performed on the client 340 (e.g., an information technology designer computer) and not on the server 302. The server 302 is responsible for receiving, among other things, requests and content from one or more client applications 346 associated with the client 340 of the EDCS 300 and responding to the received requests. In some implementations, the server 302 processes the requests using the server application 307 and/or memory 306. In addition to requests received from the client 340, requests may also be sent to the server 302 from internal users, external or third-parties, other automated applications, as well as any other appropriate entities, individuals, systems, or computers. In some implementations, various requests can be sent directly to server 302 from a user accessing server 302 directly (e.g., from a server command console or by other appropriate access method).

Each of the components of the server 302 can communicate using a system bus 303. In some implementations, any and/or all the components of the server 302, both hardware and/or software, may interface with each other and/or the interface 304 over the system bus 303 using an application programming interface (API) 312 and/or a service layer 313. The API 312 may include specifications for routines, data structures, and object classes. The API 312 may be either computer-language independent or dependent and refer to a complete interface, a single function, or even a set of APIs. The service layer 313 provides software services to the EDCS 300. The functionality of the server 302 may be accessible for all service consumers using this service layer. Software services, such as those provided by the service layer 313, provide reusable, defined business functionalities through a defined interface. For example, the interface may be software written in JAVA, C++, or other suitable language providing data in extensible markup language (XML) format or other suitable format.

While illustrated as an integrated component of the server 302 in the EDCS 300, alternative implementations may illustrate the API 312 and/or the service layer 313 as stand-alone components in relation to other components of the EDCS 300. Moreover, any or all parts of the API 312 and/or the service layer 313 may be implemented as child or sub-modules of another software module, enterprise application, or hardware module without departing from the scope of this disclosure. Similarly, client 340 can also have an API/service layer similar to the API 312 and the service layer 313.

The server 302 includes an interface 304. Although illustrated as a single interface 304 in FIG. 3, two or more interfaces 304 may be used according to particular needs, desires, or particular implementations of the EDCS 300. The interface 304 is used by the server 302 for communicating with other systems in a distributed environment—including within the EDCS 300—connected to the network 330; for example, the client 340 as well as other systems communicably coupled to the network 330 (whether illustrated or not). Generally, the interface 304 comprises logic encoded in software and/or hardware in a suitable combination and operable to communicate with the network 330. More specifically, the interface 304 may comprise software supporting one or more communication protocols associated with communications such that the network 330 or interface's hardware is operable to communicate physical signals within and outside of the illustrated EDCS 300.

The server 302 includes a processor 305. Although illustrated as a single processor 305 in FIG. 3, two or more processors may be used according to particular needs, desires, or particular implementations of the EDCS 300. Generally, the processor 305 executes instructions and manipulates data to perform the operations of the server 302. Specifically, the processor 305 executes the functionality required for inheriting metadata concepts from product resources into a semantic model.

The server 302 also includes a memory 306 that holds data for the server 302, client 340, and/or other components of the EDCS 300. Although illustrated as a single memory 306 in FIG. 3, two or more memories may be used according to particular needs, desires, or particular implementations of the EDCS 300. While memory 306 is illustrated as an integral component of the server 302, in alternative implementations, memory 306 can be external to the server 302 and/or the EDCS 300. In some implementations, memory 306 can be configured to store one or more instances of a universe 308 as described above, and a data foundation (DFX) 309/business layer (BLX) 310 file and/or other appropriate data. Typically only the universe 308 is retrieved/accessed from the server 302 by a general end user using client 340. For example, a general end user can use a business intelligence tool that only uses a published universe 308. In the case of the client 340 being used by an information technology specialist, developer, designer, etc., the universe 308, DFX 309, and/or BLX 310 file can be retrieved from the server 302 and/or stored on the client 340. For example, the information technology specialist, developer, designer, etc. can use an information design tool (IDT) to maintain and/or enhance the universe 308 and needs access to the data foundation and business layer.

The client 340 may be any computing device operable to connect to or communicate with at least the server 302 and, in the case of an information technology specialist, developer, designer, etc., provides for inheriting metadata concepts from product resources into a semantic model. In general, the client 340 comprises an electronic computing device operable to receive, transmit, process, and store any appropriate data associated with the EDCS 300. The client typically includes a processor 344, a client application 346, a memory 348, and/or an interface 349 interfacing over a system bus 343.

The client application 346 is any type of application that allows the client 340 to navigate to/from, request, view, create, edit, delete, administer, and/or manipulate content associated with the client 340 and/or the server 302. For example, in some implementations the client application 346 can be an IDT used by a technology specialist to create, edit, delete, and/or compile data foundation and business layer resource files (DFX 347a and BLX 347b, respectively). The client application 346 can also present GUI displays and associated data to an end user accessing a universe 308 on server 302. In some implementations, the client application 346 can use parameters, metadata, and other information received at launch to access a particular set of data from the server 302 and/or other components of the EDCS 300. Once a particular client application 346 is launched, a user may interactively process a task, event, or other information associated with the server 302 and/or other components of the EDCS 300.

In some implementations, the client application 346 can be a native application. In some implementations, the client application 346 can be a general access application, for example a browser (or including) a web browser. In some implementations, the client application 346 can be a native application that provides additional features and/or functions not normally provided on non-native client applications 346. Native applications typically are more closed in nature with tighter security and therefore allow the additional features and/or functionality that a non-native client application 346 is prohibited from providing.

As an example of client application 346 usage, an information technology specialist could access the DFX 347a and BLX 347b files (or corresponding files on server 302) using a client application 346, while a client application 346 used by a non-technology specialist could only be used to access the universe 308 on server 302. In some implementations, restrictions to accessing DFX, BLX, and/or universe files are established due to security, role restrictions, and/or other concerns.

When an information technology specialist accesses the DFX 347a and BLX 347b files (or corresponding files on server 302), they are typically compiled on the client 340 (in some implementations, compilation could occur on the server 302). The universe file is then published on the server 302 (e.g., universe 308) and made available to business intelligence (BI) tools for running queries. Note that the BI tools only see the universe and cannot see the underlying DFX and BLX resources (which are only visible to information technology specialists or other authorized individuals using the above-described IDT).

Further, although illustrated as a single client application 346, the client application 346 may be implemented as multiple client applications in the client 340. For example, there may be a native client application and a web-based (e.g., HTML) client application, and the like depending upon the particular needs of the client 340.

The interface 349 is used by the client 340 for communicating with other computing systems in a distributed computing system environment, including within the EDCS 300, using network 330. For example, the client 340 uses the interface to communicate with a server 302 as well as other systems (not illustrated) that can be communicably coupled to the network 330. The interface 349 may be consistent with the above-described interface 304 of the server 302. The processor 344 may be consistent with the above-described processor 305 of the server 302. Specifically, the processor 344 executes instructions and manipulates data to perform the operations of the client 340, including the functionality required to send requests to the server 302 and to receive and process responses from the server 302.

The memory 348 typically stores objects and/or data associated with the purposes of the client 340 but may also be consistent with the above-described memory 306 of the server 302 or other memories within the EDCS 300 and be used to store data similar to that stored in the other memories of the EDCS 300 for purposes such as backup, caching, and the like.

Further, the illustrated client 340 includes a GUI 342 that interfaces with at least a portion of the EDCS 300 for any suitable purpose. For example, the GUI 342 (illustrated as associated with client 340a) may be used to view data associated with the client 340, the server 302, or any other component of the EDCS 300. In particular, in some implementations, the client application 346 may act as a GUI interface for the server application 307 and/or universe 308.

There may be any number of clients 340 associated with, or external to, the EDCS 300. For example, while the illustrated EDCS 300 includes one client 340 communicably coupled to the server 302 using network 330, alternative implementations of the EDCS 300 may include any number of clients 340 suitable to the purposes of the EDCS 300. Additionally, there may also be one or more additional clients 340 external to the illustrated portion of the EDCS 300 that are capable of interacting with the EDCS 300 using the network 330. Further, the term "client" and "user" may be used interchangeably as appropriate without departing from the scope of this disclosure. Moreover, while the client 340 is described in terms of being used by a single user, this disclosure contemplates that many users may use one computer, or that one user may use multiple computers.

The illustrated client 340 (example configurations illustrated as 340a-340d) is intended to encompass any computing device such as a desktop computer, laptop/notebook computer, wireless data port, smart phone, personal data assistant (PDA), tablet computing device, one or more processors within these devices, or any other suitable processing device. For example, the client 340 may comprise a computer that includes an input device, such as a keypad, touch screen, or other device that can accept user information, and an output device that conveys information associated with the operation of the server 302 or the client 340 itself, including digital data, visual and/or audio information, or a GUI 342, as illustrated specifically with respect to the client 340a.

In some implementations, FIGS. 4A-4D can be performed (and are described) in the following order. In other implementations, the order of performance can be varied.

Figure 4A:
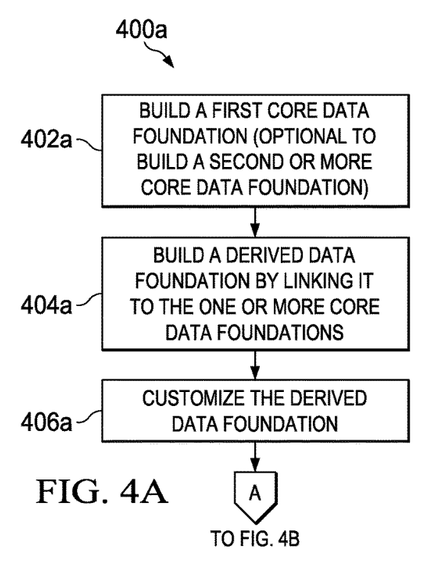
FIG. 4A is a flow chart illustrating a method for definition of core and derived data foundations according to an implementation.

FIG. 4A is a flow chart illustrating a method 400a for definition of core and derived data foundations according to an implementation. For clarity of presentation, the description that follows generally describes method 400a in the context of FIGS. 1-3. However, it will be understood that method 400a may be performed, for example, by any other suitable system, environment, software, and hardware, or a combination of systems, environments, software, and hardware as appropriate. In some implementations, various steps of method 400 can be run in parallel, in combination, in loops, or in any order.

At 402a, a first core data foundation is defined. Optionally, other core data foundations can be defined (e.g., a second-nth data foundation). From 402a, method 400a proceeds to 404a.

At 404a, a derived data foundation is defined by linking the derived data foundation to one or more core data foundations. The core data foundations can be defined on different data sources. From 404a, method 400a proceeds to 406a.

At 406a, the derived data foundation is customized. For example, customization can include: 1) selecting only necessary core tables; 2) adding JOINS (e.g., between tables from different core data foundations); 3.) Adding contexts; 4) adding calculated columns; 5) adding a list(s) of values or parameters, etc. After 406a, method 400a stops. In some implementations, method 400a proceeds to 402b of FIG. 4B.

Figure 4B:
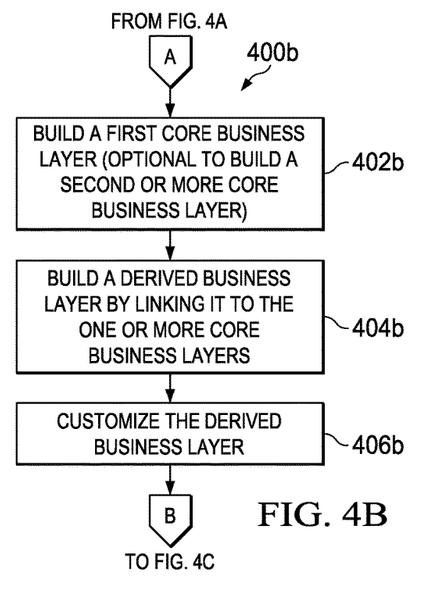
FIG. 4B is a flow chart illustrating a method for the definition of core and derived business layers according to an implementation.

FIG. 4B is a flow chart illustrating a method 400b for the definition of core and derived business layers according to an implementation. For clarity of presentation, the description that follows generally describes method 400b in the context of FIGS. 1-3, and 4A. However, it will be understood that method 400b may be performed, for example, by any other suitable system, environment, software, and hardware, or a combination of systems, environments, software, and hardware as appropriate. In some implementations, various steps of method 400b can be run in parallel, in combination, in loops, or in any order.

At 402b, a first core business layer is built. Optionally, other core business layers can be built (e.g., a second-nth business layer). From 402b, method 400b proceeds to 404b.

At 404b, in typical behavior, a derived business layer is derived by linking the derived business layer to one or more core business layers. The derived business layer exposes table columns (fields) which are in the tables visible in the data foundation. Those columns, or a calculation on the columns, are exposed as a 'business object' in the business layer. All business objects should point to tables and columns which can be found in the data foundation. If an object points to a table or a column which is not in the data foundation, it produces an error when using it in a query. For consistency, the derived business layer must be built on a data foundation, core or derived, which contains all tables and fields inherited and exposed. In summary, a 'correct' business layer should be built on a data foundation, core or derived, which contains all of the data exposed by its business objects. From 404b, method 400b proceeds to 406b.

At 406b, the derived business layer is customized. For example, customization can include: 1) selecting which core objects to expose; 2) adding new objects; 3.) Adding new list of values or parameters; 4) adding new navigation paths, etc. After 406b, method 400b stops. In some implementations, method 400b proceeds to 402c of FIG. 4C.

Figure 4C:
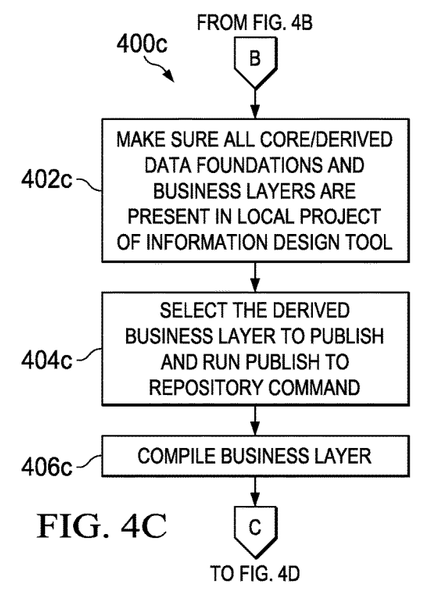
FIG. 4C is a flow chart illustrating a method for the publication of the derived business layer to a published universe according to an implementation.

FIG. 4C is a flow chart illustrating a method 400c for the publication of the derived business layer to a published universe according to an implementation. For clarity of presentation, the description that follows generally describes method 400c in the context of FIGS. 1-3, and 4A-4B. However, it will be understood that method 400c may be performed, for example, by any other suitable system, environment, software, and hardware, or a combination of systems, environments, software, and hardware as appropriate. In some implementations, various steps of method 400c can be run in parallel, in combination, in loops, or in any order.

At 402c, ensure that all core and derived data foundations and business layers are present in the local project of the information design tool (e.g., the design time client application). In some implementations, clients can access other clients and/or the server to recover derived data foundations and business layers. From 402c, method 400c proceeds to 404c.

At 404c, the derived business layer to publish is selected and a command is issued to publish the derived business layer as a universe to a repository for end user access. From 404c, method 400c proceeds to 406c.

At 406c, derived business layer is compiled with its associated data foundation and is published for consumption to the server. At this stage, all information about links is calculated and compiled into the published universe which is transferred to the server for end user access (e.g., in the server memory). After 406c, method 400c stops. In some implementations, method 400c proceeds to 402d of FIG. 4D.

Figure 4D:
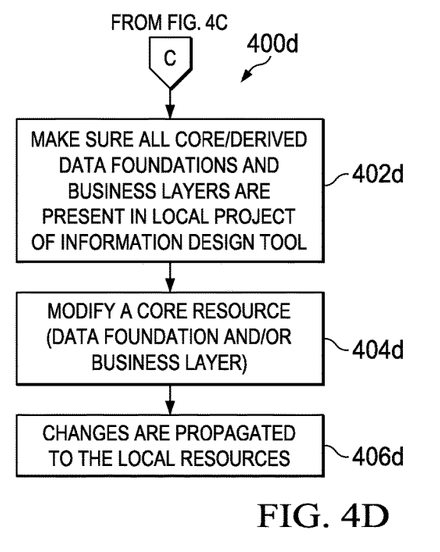
FIG. 4D is a flow chart illustrating a method for the modification of a core resource and the workflow—changes to be pushed to a published universe according to an implementation.

FIG. 4D is a flow chart illustrating a method 400d for the modification of a core resource and the workflow—changes to be pushed to a published universe according to an implementation. For clarity of presentation, the description that follows generally describes method 400d in the context of FIGS. 1-3, and 4A-4C. However, it will be understood that method 400d may be performed, for example, by any other suitable system, environment, software, and hardware, or a combination of systems, environments, software, and hardware as appropriate. In some implementations, various steps of method 400d can be run in parallel, in combination, in loops, or in any order.

At 402d, ensure that all core and derived data foundations and business layers are present in the local project of the information design tool (e.g., a client application). In some implementations, clients can access other clients and/or the server to recover derived data foundations and business layers. From 402d, method 400d proceeds to 404d.

At 404d, modify a core resource (e.g., a data foundation and/or a business layer). Save the modified core resource. From 404d, method 400d proceeds to 406d.

At 406d, changes are propagated to the local resources for the modified data foundation and/or business layer. Options following propagation can include: 1) open a resource which has been derived from the modified core resource and view core resource changes; 2) Re-publish a business layer which is derived from the modified resource (either directly if a core business layer or indirectly if a core data foundation. The published universe contains the changes inherited from the modified core resource; 3) re-publish a derived resource (business layer) if one of the inherited database connections has been modified and re-published. After 406d, method 400d stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user.

These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method executed using one or more processors and comprising:

receiving, by the one or more processors, a plurality of core data foundations representing database resources and comprising database tables and operations;

defining, by the one or more processors, a derived data foundation comprising a first plurality of links to the plurality of core data foundations and representing a hierarchical inheritance relationship of the plurality of core data foundations;

receiving, by the one or more processors, a plurality of core business layers representing business concepts and comprising data objects associated to the database tables and the operations;

defining, by the one or more processors, a derived business layer comprising a second plurality of links to the plurality of core business layers;

generating, by the one or more processors, a universe by compiling the derived business layer on top of the derived data foundation, wherein the universe exposes only data objects that are permitted to be published and that are associated with the derived business layer or inherited by the derived business layer from the derived data foundation; and processing, by the one or more processors, the universe using a computer-executable model checking tool for evaluating an integrity of the universe by determining whether one or more links of the first plurality of links or the second plurality of links is broken, such that determining that the one or more links are broken triggers a notification configured to enable a repair of the one or more links.

2. The method of claim 1, wherein each core data foundation of the plurality of core data foundations can be defined on different data sources.

3. The method of claim 1, further comprising customizing the derived data foundation by at least one of selecting only necessary core database tables, adding JOINS between tables from different core data foundations, adding contexts, adding calculated columns, or adding a list of values or parameters.

4. The method of claim 1, further comprising customizing the derived business layer by at least one of selecting which core objects to expose, adding new objects, adding new lists of value or parameters, or adding new navigation paths.

5. The method of claim 1, wherein the universe is compiled at design time and no additional compilation time is required at query time.

6. The method of claim 1, further comprising modifying a core resource, the core resource being either a data foundation or a core business layer.

7. The method of claim 6, further comprising propagating a core resource modification to local resources associated with the core resource.

8. The method of claim 7, further comprising performing one of:
opening a derived resource which has been derived from the modified core resource;
re-publishing a derived business layer derived from the modified core resource; or
re-publishing a derived business layer if an inherited database connection linking the core business layers with the derived business layer has been modified and re-published.

9. A non-transitory, computer-readable medium storing computer-readable instructions executable by a computer and operable to:
receive a plurality of core data foundations representing database resources and comprising database tables and operations;
define a derived data foundation comprising a first plurality of links to the plurality of core data foundations and representing a hierarchical inheritance relationship of the plurality of core data foundations;
receive a plurality of core business layers representing business concepts and comprising data objects associated to the database tables and the operations;
define a derived business layer comprising a second plurality of links to the plurality of core business layers;
generate a universe by compiling the derived business layer on top of the derived data foundation, wherein the universe exposes only data objects that are permitted to be published and that are associated with the derived business layer or inherited by the derived business layer from the derived data foundation; and
process the universe using a computer-executable model checking tool for evaluating an integrity of the universe by determining whether one or more links of the first plurality of links or the second plurality of links is broken, such that determining that the one or more links are broken triggers a notification configured to enable a repair of the one or more links.

10. The non-transitory, computer-readable medium of claim 9, wherein each core data foundation of the plurality of core data foundations can be defined on different data sources.

11. The non-transitory, computer-readable medium of claim 9, further comprising instructions operable to customize the derived data foundation by at least one of selecting only necessary core database tables, adding JOINS between tables from different core data foundations, adding contexts, adding calculated columns, or adding a list of values or parameters.

12. The non-transitory, computer-readable medium of claim 9, further comprising instructions operable to customize the derived business layer by at least one of selecting which core objects to expose, adding new objects, adding new lists of value or parameters, or adding new navigation paths.

13. The non-transitory, computer-readable medium of claim 9, wherein the universe is compiled at design time and no additional compilation time is required at query time.

14. The non-transitory, computer-readable medium of claim 9, further comprising instructions operable to modify a core resource, the core resource being either a data foundation or a core business layer.

15. The non-transitory, computer-readable medium of claim 14, further comprising instructions operable to propagate a core resource modification to local resources associated with the core resource.

16. The non-transitory, computer-readable medium of claim 15, further comprising instructions operable to perform one of:
opening a derived resource which has been derived from the modified core resource;
re-publishing a derived business layer derived from the modified core resource; or
re-publishing a derived business layer if an inherited database connection linking the core business layers with the derived business layer has been modified and re-published.

17. A system, comprising:
at least one computer interoperably coupled with a memory storage and configured to:
receive a plurality of core data foundations representing database resources and comprising database tables and operations;
define a derived data foundation comprising a first plurality of links to the plurality of core data foundations and representing a hierarchical inheritance relationship of the plurality of core data foundations;
receive a plurality of core business layers representing business concepts and comprising data objects associated to the database tables and the operations;
define a derived business layer comprising a second plurality of links to the plurality of core business layers;
generate a universe by compiling the derived business layer on top of the derived data foundation, wherein the universe exposes only data objects that are permitted to be published and that are associated with the derived business layer or inherited by the derived business layer from the derived data foundation; and
process the universe using a computer-executable model checking tool for evaluating an integrity of the universe by determining whether one or more links of the first plurality of links or the second plurality of links is broken, such that determining that the one or more links are broken triggers a notification configured to enable a repair of the one or more links.

18. The system of claim 17, wherein each core data foundation of the plurality of core data foundations can be defined on different data sources.

19. The system of claim 17, further configured to customize the derived data foundation by at least one of selecting only necessary core database tables, adding JOINS between tables from different core data foundations, adding contexts, adding calculated columns, or adding a list of values or parameters.

20. The system of claim 17, further configured to customize the derived business layer by at least one of selecting which core objects to expose, adding new objects, adding new lists of value or parameters, or adding new navigation paths.

21. The system of claim 17, wherein the universe is compiled at design time and no additional compilation time is required at query time.

22. The system of claim 17, further configured to modify a core resource, the core resource being either a data foundation or a core business layer.

23. The system of claim 22, further configured to propagate a core resource modification to local resources associated with the core resource.

24. The system of claim 23, further configured to perform one of:
- opening a derived resource which has been derived from the modified core resource;
- re-publishing a derived business layer derived from the modified core resource; or
- re-publishing a derived business layer if an inherited database connection linking the core business layers with the derived business layer has been modified and re-published.

* * * * *